United States Patent [19]

Stettner et al.

[11] Patent Number: 4,572,436

[45] Date of Patent: Feb. 25, 1986

[54] ELECTROMAGNETIC FUEL INJECTOR WITH TAPERED ARMATURE/VALVE

[75] Inventors: Ernest R. Stettner, Spencerport; Kenneth P. Cianfichi, Walworth; Donald D. Stoltman, Henrietta, all of N.Y.

[73] Assignee: General Motors Corporation, Detroit, Mich.

[21] Appl. No.: 685,742

[22] Filed: Dec. 24, 1984

[51] Int. Cl.[4] .......................... B05B 1/30; F16K 31/02

[52] U.S. Cl. ................................ 239/585; 251/129.16

[58] Field of Search ................... 239/585; 251/129.02, 251/129.15, 129.16, 129.22

[56] References Cited

U.S. PATENT DOCUMENTS

| | | | |
|---|---|---|---|
| 2,881,980 | 4/1959 | Beck et al. | 239/562 |
| 3,926,405 | 12/1975 | Arnold | 251/129.08 |
| 4,186,708 | 5/1985 | Bowler | 123/139 |
| 4,251,051 | 2/1981 | Quenneville et al. | 251/129.16 X |
| 4,356,980 | 11/1982 | Krauss | 239/585 |
| 4,366,944 | 1/1983 | Kah, Jr. | 251/129.16 |
| 4,394,973 | 7/1983 | Sauer et al. | 239/467 |
| 4,418,886 | 12/1983 | Holzer | 251/141 X |
| 4,471,914 | 9/1984 | Hafner et al. | 239/585 |
| 4,515,129 | 5/1985 | Stettner | 239/585 X |

FOREIGN PATENT DOCUMENTS

| | | | |
|---|---|---|---|
| 2080415 | 2/1982 | United Kingdom | 239/585 |

*Primary Examiner*—Andres Kashnikow
*Assistant Examiner*—David P. Davidson
*Attorney, Agent, or Firm*—Arthur N. Krein

[57] ABSTRACT

An electromagnetic fuel injector is provided with a tapered armature valve plate operatively positioned by means of a locator so that it is arranged so as to, in effect, pivot from a spring biased position at which it seats against a valve seat associated with a plurality of orifice discharge passages located concentrically about the axis of the injector to a second position adjacent to the working surface of the pole piece means of the associate solenoid. Preferably, the electromagnetic fuel injector is of the bottom feed type whereby it can be supplied with fuel in excess of the amount to be injected, with the flow path of fuel being arranged so that the excess fuel will purge vapors from the injector and cool the solenoid coil therein.

3 Claims, 7 Drawing Figures

ELECTROMAGNETIC FUEL INJECTOR WITH TAPERED ARMATURE/VALVE

FIELD OF THE INVENTION

This invention relates to an electromagnetic fuel injector and, in particular, to such an injector having a tapered armature valve used to control fuel discharge through a plurality of discharge orifices.

DESCRIPTION OF THE PRIOR ART

Various types of electromagnetic fuel injectors are presently used in the fuel injection systems of internal combustion engines. Such systems are either of the throttle body injection type or a port injection type. In a throttle body injection system one or more electromagnetic fuel injectors are mounted so as to supply fuel into the induction passage of a throttle body for delivery to the cylinders of an engine. In a port injection type fuel system, a plurality of electromagnetic fuel injectors are used, one for each cylinder, with each such fuel injector being located in the intake manifold of an engine so as to supply fuel only toward the intake valve of an associate cylinder.

Various electromagnetic fuel injectors for use in such fuel injection systems, as well as other solenoid controlled valve structures, have been used which have incorporated therein a solenoid armature that is located between the pole piece of the solenoid and a fixed valve seat whereby the armature will operate as a valve member. Examples of such electromagnetic fuel injectors or solenoid controlled valve structures are described in U.S. Pat. Nos. 2,881,980 Beck et al; 3,926,405 Arnold; 4,356,980 Krauss; 4,394,973 Sauer et al; 4,418,886 Holzer; and, 4,366,944 Kah, Jr. The first three above-identified patents show arrangements in which the armature valve is supported by spring means, the next two above-identified patents showing different arrangements whereby the armature valve is hinged at one end for pivotable movement between a valve seat and associate armature, while the last above-identified patent merely shows a flat armature valve plate axially movable between a valve seat and an associate solenoid pole piece.

As an improvement over such prior art armature valve arrangements there is also disclosed in copending U.S. patent application Ser. No. 503,070, filed June 10, 1983 in the name of Ernest R. Stettner and assigned to a common assignee, an armature valve disc that is operable between the pole piece of a solenoid and a valve seat surface for controlling flow through an orifice passage radially offset from the central axis of the associate solenoid, wherein either the armature valve disc or the valve seat surface presents a surface inclined at an angle to the working surface of the pole piece whereby the axial movement of the armature valve disc between the valve seat surface and the working surface of the pole piece is greater adjacent to the valve seat surface than at a location diametrically opposite thereof. With this arrangement, the average working air gap between the armature valve disc and the pole piece is reduced to thereby increase the magnetic force and to reduce fuel displacement by the armature valve disc movement.

SUMMARY OF THE INVENTION

The present invention relates to an electromagnetic fuel injector with tapered armature for use in an internal combustion engine. The subject fuel injector includes a housing means with an axial bore therethrough with an orifice plate fixed in the bore at one end of the housing and a solenoid assembly fixed in the other end of the housing in spaced apart relationship to the orifice plate by means of a spacer ring whereby to define therewith a fuel chamber adapted to be supplied with fuel. The orifice plate is provided with an annular valve seat surface and with plural circumferentially spaced apart orifice passages therethrough located concentrically to the bore axis for the discharge of fuel from the injector. Flow through the orifice passages in the orifice plate is controlled by a tapered armature valve plate with the working surface of the armature valve plate presenting a surface inclined at an angle to the axial bore whereby the axial movement of the armature valve disc between the valve seat surface and the working surface of the solenoid assembly is greater adjacent to the valve seat surface than at a location next adjacent to the inner peripheral wall of the spacer ring, an armature locator or retainer being operatively associated with the armature valve plate and the spacer ring to radially locate the armature valve plate so that its thicker end is maintained substantially in abutment against the inner peripheral surface of the spacer ring.

It is therefore a primary object of the present invention to provide an improved electromagnetic fuel injector having a tapered armature valve plate operatively positioned by a retainer for, in effect, pivotal movement between the parallel spaced apart working surface of a solenoid pole piece and a flat valve seat surface for controlling the discharge flow through orifice passage means extending from the valve seat surface.

Another object of the invention is to provide an improved electromagnetic fuel injector wherein the working surface of an armature valve plate, positioned by a retainer in a location so that its opposite surface can engage a flat valve seat surface encircling a discharge orifice passage means in an associate orifice plate, is inclined relative to the plane of the opposed working surface of a solenoid pole piece whereby the average working air gap between the opposed working surface of the pole piece and armature valve plate is reduced.

Still another object of the present invention is to provide an improved electromagnetic fuel injector of the above type which includes features of construction rendering it easy and inexpensive to manufacture and which is reliable in operation, and in other respects suitable for use in the fuel injection systems of production motor vehicles.

For a better understanding of the invention, as well as other objects and further features thereof, reference is had to the following detailed description of the invention to be read in connection with the accompanying drawings:

DESCRIPTION OF THE PREFERRED EMBODIMENT

Figure 1:
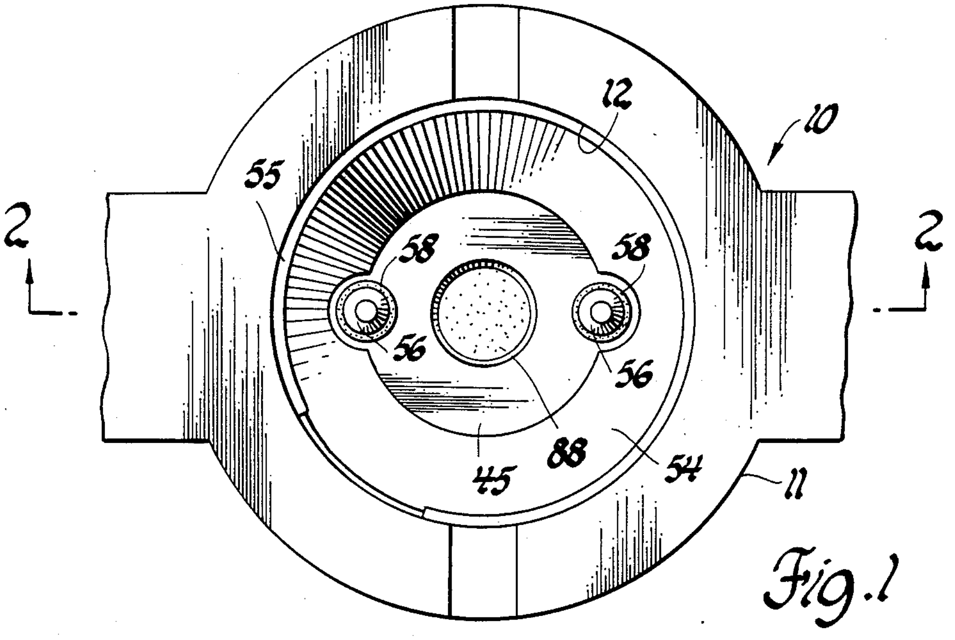
FIG. 1 is an enlarged top view of an electromagnetic fuel injector with tapered armature valve in accordance with a preferred embodiment of the invention.
Figure 2:
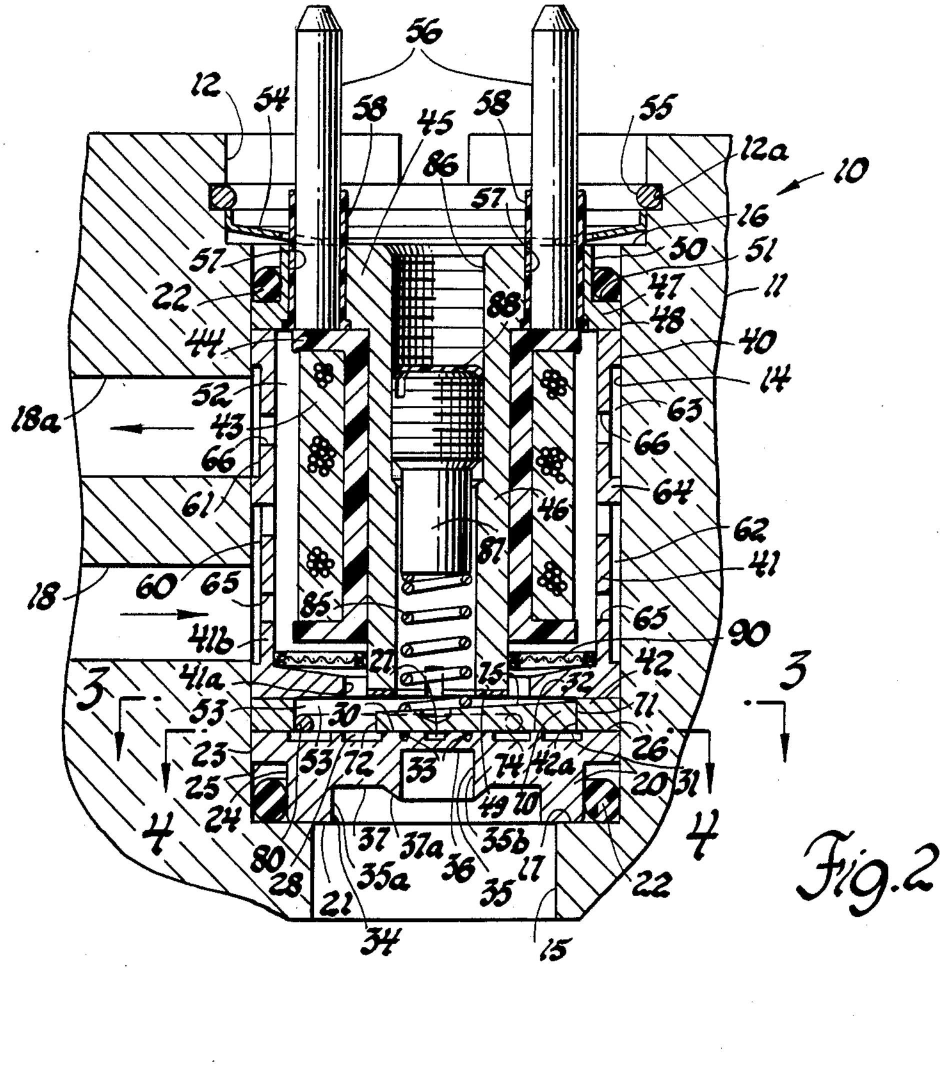
FIG. 2 is a longitudinal cross-sectional view of the subject injector taken along line 2—2 of FIG. 1.

Referring first to FIGS. 1 and 2, the electromagnetic fuel injector, generally designated 10, in accordance with a preferred embodiment of the invention has an outer body case or housing 11, which, in the construction shown, is in the form of a fuel body, only a portion of which is shown. The housing 11, in the form of a fuel body, is for use in a throttle body fuel injection system of the type disclosed, for example, in U.S. Pat. No. 4,186,708 entitled "Fuel Injection Apparatus with Wetting Action", issued Feb. 5, 1980 to Lauren L. Bowler.

As best seen in FIG. 2, the housing 11 is provided with a stepped axial bore therethrough whereby to define an upper wall 12, an intermediate wall 14 and a lower wall defining a discharge passage 15, with these walls being of progressively reduced internal diameters. Walls 12 and 14 are interconnected by a shoulder 16 and wall 14 and the wall defining the discharge passage 15 are connected by a flat shoulder 17. Housing 11 is also provided with a lower fuel inlet passage 18 and an upper fuel outlet passage 18*a*, each of which at one end opens through the wall 14. The inlet passage 18 at its opposite end is connected to a source of fuel at a suitable supply pressure while the outlet passage 18*a* is connected to a drain line having a conventional pressure regulator therein whereby the pressure of fuel in this outlet passage is maintained at approximately the same pressure as the supply pressure.

A circular valve seat orifice plate 20 is located within the bore wall 14 of the housing 11 so that its lower or outboard annular end surface 21 rest on the flat shoulder 17. An O-ring seal 22 is operatively positioned to effect a seal between the valve seat orifice plate 20 and the housing bore wall 14. For this purpose, in the construction shown, the orifice plate 20 is formed with a stepped circular external configuration so as to define an upper wall 23 of an external diameter so as to be slidably received by the interior intermediate wall 14 of the housing and, a lower reduced diameter wall 24 that is interconnected by a flat shoulder 25 to the upper wall 23, these last two parts thus defining an annular recess to receive the O-ring seal 22.

The top, with reference to FIG. 2, or inboard surface 26 of the valve seat orifice plate 20 is provided with a central recess 27 and with a concentric substantially annular groove 28 located a predetermined distance radially outboard of the recess 27 so as to define therebetween a substantially annular annulus shaped land or valve seat 30. A second annular groove 31 located concentrically radially outboard of groove 26 defines therebetween an annular land 32. Surface 26, valve seat 30 and the land 32 are in a common flat plane and preferably are lapped surfaces.

Figure 5:
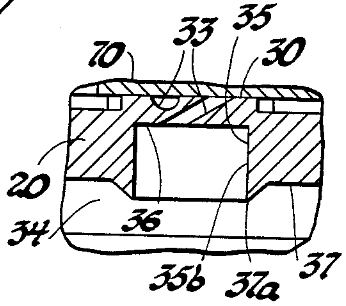
FIG. 5 is an enlarged cross-sectional view of the orifice plate, per se, and a portion of the armature valve plate of the injector taken along line 5—5 of FIG. 4.
Figure 4:
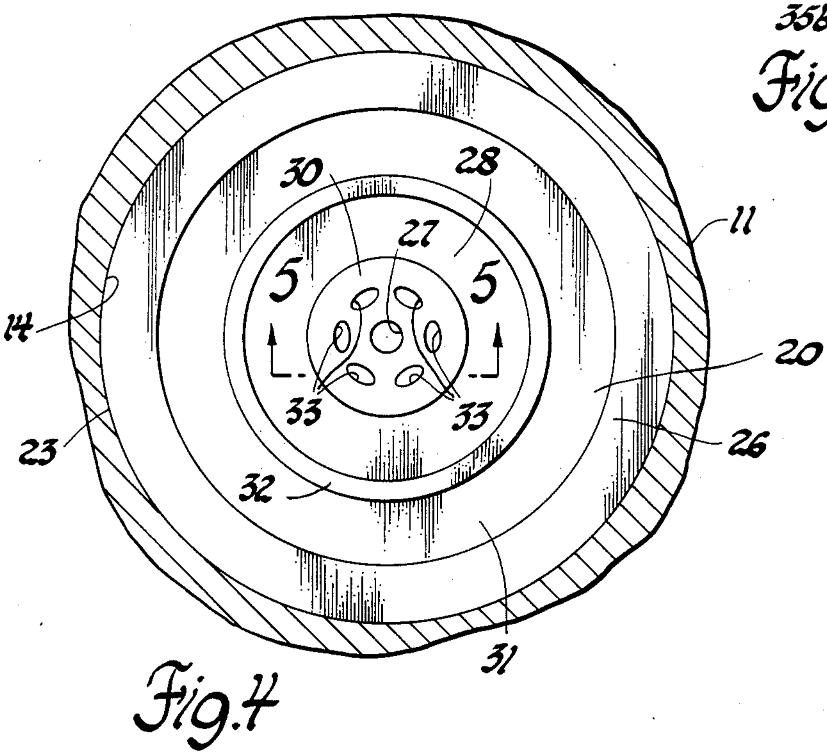
FIG. 4 is a cross-sectional view taken along line 4—4 of FIG. 2 to show details of the orifice plate of the injector.

As best seen in FIGS. 2, 4 and 5, a plurality of circumferentially spaced apart orifice discharge passages 33, each of predetermined diameter as desired, extend from the surface of the valve seat 30 so as to open into a discharge passage means 34 defined by a stepped bore that extends upward from the lower or outboard end surface 21 of the orifice plate 20. As best seen in FIG. 2, this blind bore, in the embodiment shown, forming the discharge passage means, defines a circular lower wall 35*a* of an internal diameter equal to or preferably, as shown, slightly less than the internal diameter of wall 15 in housing 11, and an upper wall 35*b* of reduced internal diameter relative to lower wall 34 which terminates at its upper end at a flat base 36 in closely spaced parallel relationship to the valve seat 30 so as to, in effect, define therewith a thin orifice disc through which the orifice discharge passages 33 extend. Walls 35*a* and 35*b* are interconnected by a shoulder 37 which closely adjacent to the wall 35 is inclined downward so as to provide for an annular sharp edge 37*a* interconnection with the lower end of wall 35 for a purpose well known in the fuel injection art.

The orifice discharge passages 33, in the construction shown and as best seen in FIGS. 4 and 5, have their inboard ends at the valve seat 30 surface arranged in a circular spaced apart pattern concentric to the central axis of the valve seat orifice plate 20 and, as seen in FIG. 5, each orifice discharge passage 33, in the construction shown, is inclined at an angle of approximately 30° to the plane of the surface of the valve seat 30. In the embodiment shown, six such orifice discharge passages 33 are used and are located in circumferentially equally spaced apart relationship to each other.

A solenoid assembly, generally designated 40, is positioned in the housing 11 so that the apertured base 41*a* of its cup-shaped outer pole piece 41 made of suitable magnetic soft iron, abuts against a spacer ring 42 slidably received by the bore wall 14 of housing 11 so as to abut at its lower end surface against the radially outer inboard surface 26 of the valve seat orifice plate 20.

The solenoid assembly 40 further includes a solenoid coil 43 wound on a bobbin 44 that encircles a tubular inner pole piece 45 about its reduced diameter depending stem 46 portion. This stem 46 portion of the pole piece 45 is of an external diameter so as to be loosely encircled by the apertured base 41*a* of the outer pole piece 41. The inner pole piece 45, in the construction illustrated, further includes a circular upper flange portion 47 of stepped external configuration so as to define a circular lower wall 48, of a diameter to be slidably received by the wall 14 in the housing 11, and an upper wall 50 of reduced diameter that is connected by a flat shoulder 51 to wall 48. Wall 50 and shoulder 51 thus define an annular recess to receive an O-ring seal 22 used to effect a seal between the wall 14 of housing 11 and the inner pole piece 45.

As illustrated, the bobbin 44 is positioned so that its upper flange abuts against the lower surface of flange 47, with the bobbin 44 and coil 43 thus being encircled by the tubular portion 41*b* of the outer pole piece 41 but in radial spaced apart relationship thereto.

In addition, the axial extent of the bobbin 44 is less than the axial extent of the stem portion 46 of the inner pole piece 45 so that this stem portion 46 and the bobbin 44 and coil 43 assembly forms with the interior walls of the outer pole piece a fuel chamber 52 that is in flow communication with a fuel cavity 53 defined in part by the internal peripheral wall 42*a* of the spacer ring 42.

In the construction shown, the inner pole piece 45 is axially positioned within the wall 14 of housing 11 so that the lower outer surface of its flange portion 47 abuts against the upper end of the outer pole piece 41 and is retained thereagainst by means of a centrally apertured, dished, spring retaining washer 54, made for example of stainless steel, which in turn is held against axial movement in one direction, upward with reference to FIG. 2, by means of a C-shaped wire retainer 55 positioned in a suitable annular groove 12*a*provided for this purpose in the upper wall 12 of housing 11.

Preferably, as shown, a shim 49 of non-magnetic material and which may be in the form of a washer is suitably fixed to the lower working surface of the stem 46 portion of the inner pole piece 45 so as to define, in effect, a fixed minimum working air gap between the opposed working surfaces of this inner pole piece 45 and a tapered armature valve plate 70 to be described in detail hereinafter.

As best seen in FIG. 2, the axial extent of the stem 46 portion of the inner pole piece 45 and the shim washer 49, if used, is preselected relative to the axial extent of the outer pole piece 41 so that its lower working surface lies in or slightly above the bottom working surface of the outer pole piece 41 with reference to this Figure.

The solenoid coil 43 is adapted to be supplied with electrical power, via a pair of terminal leads 56 that extend through suitable apertures 57 provided for this purpose in the flange 47 of the inner pole piece 45. In the construction shown, each of the leads 56 is suitably electrically insulated from the inner pole piece 45 as by means of a suitable molded seal/insulator 58, as illustrated in FIG. 2.

As best seen in FIG. 2, the outer peripheral surface of the outer pole piece 41 is preferably provided with axial spaced apart annular grooves 60 and 61 which define, with the wall 14 of the housing 11, annulus shaped fuel supply and fuel drain chambers 62 and 63, respectively, that are separated from each other by an annular outer peripheral land 64 which has a predetermined exterior diameter so as to be in substantial sealing engagement with the wall 14 for a purpose to be described hereinafter.

As shown, the fuel supply chamber 62 is axially located so as to be in flow communication with the inlet passage 18 and is in flow communication with the fuel chamber 52 and then with the fuel cavity 53 via at least one row of plural, circumferentially spaced apart radial inlet ports 65, two such rows of inlet ports being used in the embodiment illustrated. In a similar manner the fuel drain chamber 63 is axially located so as to be in flow communication with the outlet passage 18*a* and is in flow communication with the fuel chamber 52 via at least one row of plural, circumferentially spaced apart radial drain ports 66.

With the above described arrangement, during engine operation, the injector 10 can be supplied with a quantity of pressurized fuel in excess of that to be discharged by the injector so that fuel is forced to flow via the inlet passage 18, supply chamber 62 and through inlet ports 65 into the fuel chamber 52 and fuel cavity 53 and then the excess fuel can flow upward through the fuel chamber 52 for drain low via the drain ports 66, fuel drain chamber 63 and the outlet passage 18*a* back to a source of low pressure fuel, as in a fuel tank, not shown, whereby vapors which may form in the fuel cavity 53 or fuel chamber 52, as during a hot soak mode, will be purged from the injector 10.

Now in accordance with a feature of the invention, fuel flow from the fuel cavity 53 out through the orifice discharge passages 33 is controlled by a tapered armature valve plate 70 that is operatively positoned, in a manner to be described, for movement between the valve seat 30 and the lower working surfaces of the inner and outer pole pieces 45 and 41 respectively.

Figure 3:
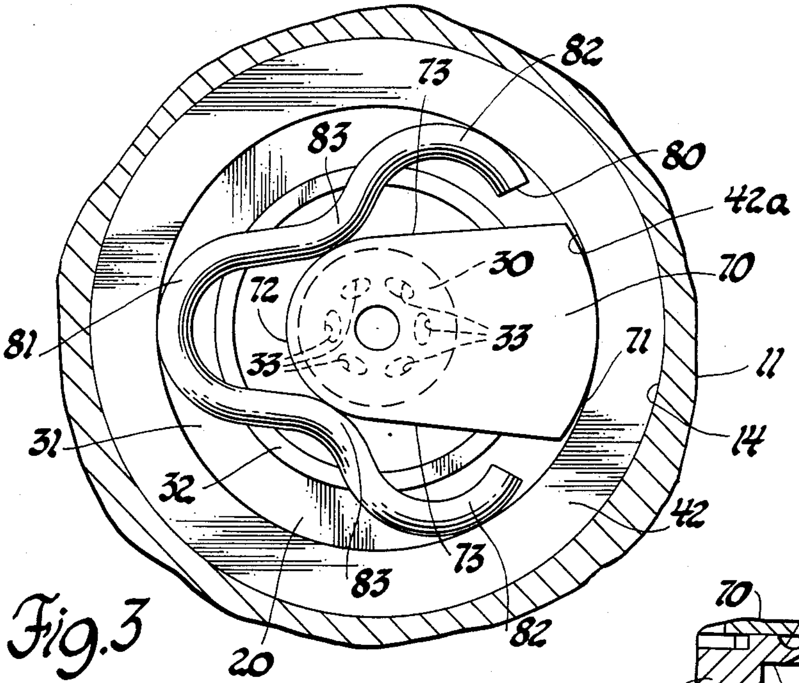
FIG. 3 is a cross-sectional view taken along line 3—3 of FIG. 2 to show the operative relationship of the tapered armature valve and retainer within a fuel chamber defined in part by a spacer ring.

As seen in FIG. 3, the armature valve plate 70 is of somewhat of pie-shaped configuration and is provided with a radial outward arcuate or semi-circular end surface 71 formed with a radius substantially smaller than the internal diameter of the inner peripheral wall 42*a* of the spacer ring 42 so that during contact of this end surface 71 against the inner peripheral wall 42*a* substantially only line contact will occur between these surfaces. The armature valve plate 70 at its radial inward end is provided with a semi-circular end surface 72 formed with a radius at least equal to but preferably greater than $\frac{1}{2}$ times the outside diameter of the valve seat 30, with this end surface 72 being connected to the end surface 71 by opposed flat side surfaces 73.

As best seen in FIG. 2, the armature valve plate 70, when viewed from its side is of tapered configuration and is provided with a lower, flat, preferably lapped, valve seating surface 74 for seating engagement with the surface of the valve seat 30 and an opposed inclined upper working surface 75 that tapers downward toward the valve seating surface 74 from its radial outer end surface 71 to the radial inward end surface 72. As shown, the thickness or height of the armature valve plate 70 adjacent to its maximum radial outer end surface 71 is preselected relative to the height or thickness of the spacer ring 42 so that a slight working air gap exists between this working surface 75 and the opposed working surface of the outer pole piece 40 when the armature valve plate is in the valve seated position shown, while the minimum height or thickness of the armature valve plate 70 adjacent to its radial inner end surface 72 is preselected, as desired whereby to define a predetermined working air gap between this end of the working surface 75 of the armature valve plate 70 and the opposed working surface of the inner pole piece 45.

It will thus be appreciated by those skilled in the art, that the angle of inclination of the working surface 75 relative to the valve seating surface 74 will be determined for a given application by the radial extent of the armature valve plate 70 and the above-described predetermined, desired working air gap dimensions.

As an example in an electromagnetic fuel injector 10 for a particular engine throttle body injection system application, the spacer ring 42 had a thicknesss of approximately 0.0555 inch (1.4097 mm) and the diameter of its inner wall was approximately 0.480 inch (12.192 mm). In this application, the armature valve plate 70 was approximately 0.338 inch (8.585 mm) long with a thickness of approximately 0.0542 inch (1.3767 mm) adjacent to its outer end surface 71 and a thickness of approximately 0.0470 inch (1.1938 mm) adjacent to its inner end surface 72.

In the above application, with the armature valve plate 70 seated against the valve seat 30, as shown in FIG. 2, there was provided a working air gap of only approximately 0.0008 inch (0.0203 mm) between the armature valve plate adjacent to its radial outer end surface 71 end of its working surface 75 and the working surfaces of the outer pole piece 41 while at the opposite end of the armature valve plate 70, the working air gap between its working surface 74 and the effective working surfaces of the inner and outer pole pieces 45 and 41 was approximately, 0.0080 inch (0.2032 mm). However, with this arrangement, the average working air gap was approximately only 0.004 inch (0.1016 mm).

The armature valve plate 70 is radially positioned within the spacer ring 42 so that the radial inward end surface 72 is located substantially concentric with the valve seat 30 and therefore with the stepped bore in the housing defining the walls 12, 14 and 15 by means of a locator or retainer 80, made, for example, of a non-magnetic material, such as phosphor bronze or brass.

In a preferred embodiment and as best seen in FIG. 3, the retainer 80 is provided with a central outward bent arcuate base portion 81, a pair of outward latter at one end thereof being connected to an bent arcuate free end portion 82, with each of the associate end of the base portion 81 by inward bent arcuate portion 83. The retainer 80 is configured and sized so that the outer peripheral edge of the base portion 81 and free end portion 82 will contact the inner peripheral wall 42*a* of the spacer ring 42 and so that the inward bent arcuate portion 83 will contact opposite sides of the inner end surface 72 of the armature valve plate 70, thus providing for five contact points with these elements. That is, the retainer 80 will contact the wall 42*a* of the spacer ring 42 at circumferentially spaced apart locations thereof and will contact the armature valve plate 70 at two points whereby to locate the armature valve plate 70 so that its radial inner end surface 72 is maintained approximately concentric with the outer peripheral edge of the valve seat surface 30 and the axis of the bore in housing 11. With this arrangement, the armature valve plate 70 is free to rotate within the confines of the spacer ring 42.

The armature valve plate 70 is normally biased so that its valve seating surface 74 is in seating engagement with the valve seat 30, the position shown in FIG. 2, by means of a coiled valve return spring 85 loosely received in the lower end of a stepped, internally threaded bore 86 extending axially through the inner pole piece 45. As illustrated in FIG. 2, one end of the spring 85 abuts against the upper working surface 75 of the armature valve plate 70 while the opposite end thereof abuts against the lower end of an adjusting screw 87 adjustably threaded into the bore 86. After assembly and adjustment for the desired spring force of the valve return spring 85 by axial positioning of the adjusting screw 87, as necessary, a suitable sealant and locking material 88 is applied to the upper interface of the adjusting screw 87 and the threads of bore 86 whereby to prevent rotation of the adjusting screw and to effect a fluid seal between it and the threads of the bore 86 wall.

In the embodiment shown in FIG. 2, a fuel filter 90 of washer like configuration is operatively positioned within the lower end of the outer pole piece 41 whereby its outer peripheral lower end portion abuts against the internal shoulder 41*b* of base 41*a* while its inner peripheral portion encircles the lower exposed end of the stem 46 of the inner pole piece 45.

Also as shown in FIG. 2, the lower tubular stem 46 end of the inner pole piece 45 and the circumferentially spaced apart slot, 46*a* to provide for non-magnetic shim 49, if used, are provided with the free flow of fuel between the fuel cavity 53 and the cavity for spring 85 defined in part by the lower portion of bore 86 wall in the inner pole piece.

Figure 6:
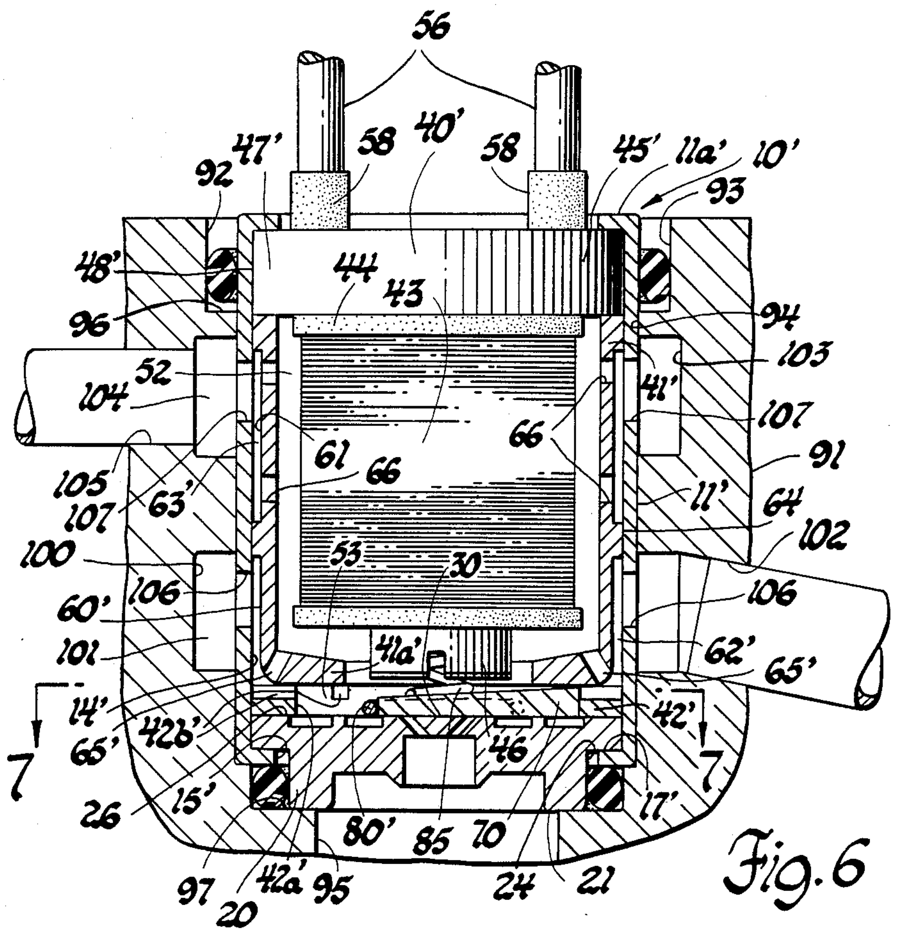
FIG. 6 is a cross-sectional view of an alternate embodiment of an electromagnetic fuel injector with tapered armature valve in accordance with the invention, with parts of the solenoid assembly thereof shown in elevation; and, FIG. 7 is a cross-sectional view of the injector of FIG. 6 taken along line 7—7 of FIG. 6 showing an alternate spacer ring and armature valve plate retainer embodiment.
Figure 7:
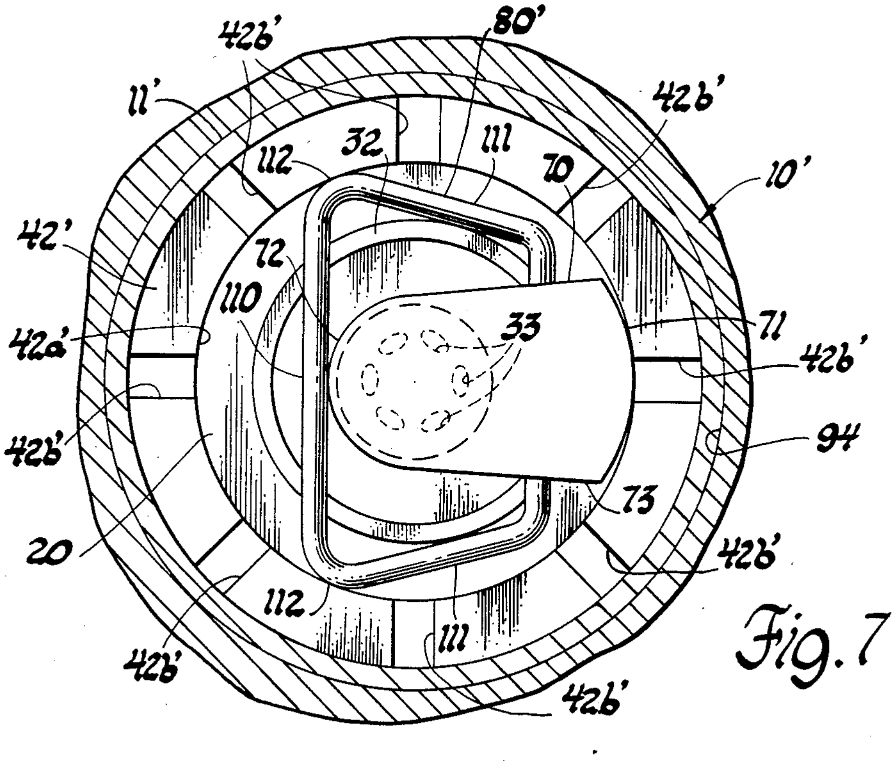

An alternate embodiment of an electromagnetic fuel injector, generally designated 10′, in accordance with the invention is shown in FIGS. 6 and 7, wherein similar parts are designated by similar numerals but with the addition of a prime (′) where appropriate.

In this alternate embodiment, as best seen in FIG. 6, the internal working elements of the injector are mounted and, in effect, encapsulated, in a housing 11′ having a suitable external configuration, as desired, whereby the electromagnetic fuel injector 10′, as a unit assembly, can be mounted in a conventional manner in a suitable injector socket provided for this purpose in either an intake manifold for use in a port fuel injection system or, as shown, in a fuel body 91 for use in a throttle body fuel injection system.

For this purpose, the fuel body 91 is provided with an injector socket 92 formed by a stepped bore therethrough defining an internal upper wall 93, an intermediate wall 94 and a lower wall 95, with these walls being of progressively reduced internal diameters. Walls 93 and 94 are connected by a flat shoulder 96 and walls 94, 95 are connected by a flat shoulder 97. The injector socket 92, when formed for electromagnetic fuel injector 10′ shown, is also use with a bottom fuel type injector, such as the provided with a lower annular groove 100 defining a fuel supply chamber 101 surrounding a lower portion of the injector 10′ that is in flow communication with one end of a fuel supply passage 102 in the fuel body that is connectable at its opposite end to a source of fuel at a suitable supply pressure and an upper annular groove 103, axially spaced apart relative to groove 100, so as to define a fuel drain chamber 104 surrounding an upper portion of the injector 10′ which is in flow communication with one end of a drain passage 105, the opposite end of which is connectable, for example, to the fuel supply tank, not shown, with a suitable pressure regulator, not shown, operatively located, for example, in a downstream portion of the drain passage 105 for a purpose well known in the art.

Accordingly, the housing 11′, in the construction shown, is, as originally formed, of straight cylindrical configuration and having a predetermined outside diameter so that it can be slidably received by the wall 94 of the injector socket 92 and it is provided with a stepped bore therethrough which defines a circular inner wall 14′ and a lower wall 15′ of reduced diameter relative to wall 14′. Walls 14′ and 15′ are connected by a flat shoulder 17′. As best seen in FIG. 6, the housing 11′ is provided with a lower first set of plural circumferentially spaced apart inlet ports 106 axially located so as to be in flow communication with the fuel supply chamber 101 and an upper second set of plural circumferentially spaced apart drain ports 107 axially located so as to be in flow communication with the fuel drain chamber 104.

A circular valve seat orifice plate 20, similar to that previously described with reference to the embodiment shown in FIGS. 1–5 is located within the bore wall 14′ of housing 11′ so that its flat shoulder will abut against the internal shoulder 17′ of the housing 11′, the internal diameter of the lower wall 15′ of the housing being preselected so that it loosely encircles the lower wall 24 portion of the valve plate 20.

The solenoid assembly, generally designated 40′, is positioned in the housing 11′ so that the centrally apertured base 41*a′* of its cup-shaped outer pole piece 41′ abuts against the spacer ring 42′ slidably received by the bore wall 14′ of housing 11′ so that its lower end surface abuts against the radially outer inboard surface 26 of the valve seat orifice plate 20.

The solenoid assembly 40', which is similar to the previously described solenoid assembly 40 also includes a solenoid coil 43 wound on a bobbin 44 that encircles a tubular inner pole piece 45' about its reduced diameter depending stem portion 46. The inner pole piece 45' is similar to the inner pole piece 45 as previously described and has a valve return spring 85 operatively positioned therein and axially retained by means of an adjusting screw 87, not shown in FIG. 6. However as shown, the flange 47' of the inner pole piece 45' in this embodiment is of straight external configuration so that the outer peripheral wall 48' thereof is slidably received by wall 14' of the housing 11', so that after assembly of all of the internal elements of the injector into the housing 11' the upper free end thereof can be spun over to form a radial inward extending flange **11*a'* that abuts against the upper surface of the flange 47' of the inner pole piece 45' whereby it, the outer pole piece 41', spacer ring 42' and the valve seat orifice plate 20 are held in stacked, sealed relationship to each other between this flange 11*a'* and the internal shoulder 17' of the housing 11'**.

As illustrated, the outer pole piece 41' is similar in construction to that of the inner pole piece 41 of the FIGS. 1–5 embodiment. Thus the outer pole piece 41' is provided with an upper annular groove 61 to define with the wall 14' of housing 11' a fuel drain chamber 63' and with drain ports 66 to effect flow communication between the fuel chamber 52 and this drain chamber 63'. However, at its lower end, the annular groove 60', defining part of the supply chamber 62', in this embodiment, extends downward from land 64 to the lower end of the outer pole piece 41' and the inlet ports 65' are located next adjacent to the base **41*a'* portion thereof. In addition in this embodiment, the spacer ring 42' is provided with circumferentially spaced apart groove 42*b'*** in its upper surface.

With the above described arrangement, the incoming pressurized fuel supply, which would be cool relative to the fuel being drained or bypassed from the injector 10' would be substantially directed into the fuel cavity 53 toward the valve seat 30 prior to its exposure to heat losses from the solenoid coil 43, with all of the excess or bypass fuel then flowing upward around the solenoid coil 43 to cool it while also, in effect, cooling the injector assembly as heat is conducted thereto from the associate fuel body 91 in the application illustrated.

In this alternate embodiment injector 10', an alternate embodiment locator or retainer 80', as best seen in FIG. 7, is used to retain the armature valve plate 70 in operative relationship to the valve seat 30 of the valve seat orifice plate 20. The retainer 80', made of the same type of material as the retainer 80, in this embodiment is of substantial C-shaped configuration and is provided with a straight base portion 110, a pair of L-shaped free end leg portions 111, with each of the latter at one end thereof being connected to an associate end of the base portion 100 by an outward bent arcuate portion 112. The retainer 80' is sized and configured so that the outer peripheral edges of arcuate portions 112 will contact the inner peripheral wall **42*a'* of the spacer ring 42' and so that the inward edge surface of the base portion 110 contacts the inner end surface 72 of the armature valve plate 70 and the free ends of the free end leg portions 111 contact the side surfaces of the armature valve plate 70, as shown in FIG. 7. This configuration of the retainer 80' also provides for five point contact, but in this embodiment two of the contact points are associated with the peripheral wall 42*a'* and the other three contact points are with the armature valve plate 70 whereby this latter element is always maintained in operative relationship to the valve seat surface 30 while still permitting the armature valve plate 70 and, of course the retainer 80' to rotate relative to the fixed spacer ring 42'**.

While the invention has been described with reference to the structures disclosed herein, it is not confined to the specific details set forth, since it is apparent that many modifications and changes can be made by those skilled in the art. For example, although the electromagnetic fuel injectors in accordance with a feature of the invention are shown and described as being of the bottom feed type, it will be apparent to those skilled in the art that they could be converted into top feed type injectors by forming the adjusting screw 87 as an elongated tubular member whereby the upper free end thereof would extend outward from the associate inner pole piece 45 or 45' so that a fuel supply conduit can be attached to it in a manner known in the art. This application is therefore intended to cover such modifications or changes as may come within the purposes of the improvements or scope of the following claims.

The embodiments of the invention in which an exclusive property or privilege is claimed are defined as follows:

1. A fuel injector for supplying fuel to the cylinder of an internal combustion engine, said injector including a housing means having a stepped bore extending axially therethrough; an orifice valve plate fixed in said bore of said housing adjacent one end thereof to partly enclose said one end, said orifice valve plate having a valve seat surface means and an opposed outboard surface with an orifice passage means extending therethrough located concentrically with said axis; a spacer ring positioned in said housing means in abutment on one side thereof against said orifice valve plate; a solenoid means fixed in said housing means, said solenoid means including a pole piece means with a working surface means positioned at right angles to said axis and positioned in axial spaced apart opposed relationship to said valve seat surface by said spacer ring whereby to define a fuel chamber means therewith; a fuel supply means operatively associated with said housing means and said pole piece means and having one end thereof connectable to a source of fuel and having its other end in flow communication with said fuel chamber; a tapered armature valve operatively positoned in said fuel chamber asymmetrical to said axis for movement between said opposed working surface means of said pole piece means and said valve seat surface; a spring means operatively associated with said armature valve to normally bias said armature valve into seating engagement with said valve seat surface; said armature valve presenting a working surface inclined at an angle to said axis whereby the axial movement of said armature valve between said valve seat surface and said working surface means of said pole piece means is greater adjacent to said orifice passage means than at a location diametrically opposite thereof; and an armature locator operatively fixed to said tapered armature and operative within said spacer ring whereby to prevent radial and lateral motion of said armature valve within said spacer ring so as to maintain said armature valve in operative relationship to said valve seat surface.

2. A fuel injector for supplying fuel to the cylinder of an internal combustion engine, said injector including a housing means having a bore extending axially therein; an orifice/valve plate fixed in said bore of said housing adjacent one end thereof to partly enclose said one end, said orifice/valve plate having a valve seat surface means and an opposed outboard surface with an orifice passage means extending therethrough located concentrically with said axis; a spacer ring positioned in said housing means in abutment on one side thereof against said orifice/valve plate; a solenoid means fixed in said housing means, said solenoid means including a pole piece means with a working surface means positioned at right angles to said axis and positioned in axial spaced apart opposed relationship to said valve seat surface by said spacer ring whereby to define a fuel chamber therewith; a fuel supply passage means operatively associated with said housing means and said pole piece means and having one end thereof connectable to a source of pressurized fuel and having its other end in flow communication with said fuel chamber means; a fuel drain passage means operatively associated with said housing means and said pole piece means in axial spaced apart relationship above said fuel supply passage means and having one end thereof in flow communication with said fuel chamber means and having its other end connectable to a source of low pressure fuel; a tapered armature valve operatively positioned in said fuel chamber asymmetrical to said axis for movement between said opposed working surface means of said pole piece means and said valve seat surface; a spring means operatively associated with said armature valve to normally bias said armature valve into seating engagement with said valve seat surface; said armature valve presenting a working surface inclined at an angle to said axis whereby the axial movement of said armature valve means between said valve seat surface and said working surface means of said pole piece is greater adjacent to said orifice passage means than at a location diametrically opposite thereof; and an armature locator operatively fixed to said ° tapered armature valve and positioned within said spacer ring whereby to prevent radial and lateral motion of said tapered armature within said spacer ring so as to retain said armature valve in operative position relative to said valve seat.

3. A fuel injector for supplying fuel to the cylinder of an internal combustion engine, said injector including a housing means having a stepped bore extending axially therethrough and having radial spaced apart lower and upper supply and drain ports, respectively; an orifice/valve plate fixed in said bore of said housing adjacent one end thereof to partly enclose said one end, said orifice/valve plate having a valve seat surface means and an opposed outboard surface with an orifice passage means extending therethrough located concentrically with said bore axis; a spacer ring positioned in said housing means in abutment on one side thereof against said orifice/valve plate; a solenoid means fixed in said housing means, said solenoid means including a pole piece means having a cup-shaped outer pole piece and an inner pole piece defining a working surface means positioned at right angles to said axis and located in axial spaced apart opposed relationship to said valve seat surface by said spacer ring whereby to define a fuel chamber means therewith; a fuel supply means operatively associated with said outer pole piece and having one end thereof in flow communication with said supply port and having its other end in flow communication with said fuel chamber means and a fuel drain means operatively associated with said outer pole piece for effecting flow communication between said drain port and said fuel chamber means; a tapered armature valve operatively positioned in said fuel chamber asymmetrical to said axis for movement between said opposed working surface means of said pole piece means and said valve seat surface; a spring means operatively associated with said armature valve to normally bias said armature valve into seating engagement with said valve seat surface; said armature valve presenting a working surface inclined at an angle to said axis whereby the axial movement of said armature valve means between said valve seat surface and said working surface means of said pole piece means is greater adjacent to said orifice passage means than at a location diametrically opposite thereof; and an armature locator fixed in operative engagement against opposite sides of said tapered armature whereby to prevent radial and lateral motion of said tapered armature within said spacer ring, while still permitting rotative movement of said tapered armature and said armature locator within said spacer ring.

* * * * *

UNITED STATES PATENT AND TRADEMARK OFFICE
CERTIFICATE OF CORRECTION

PATENT NO. : 4,572,436

DATED : February 25, 1986

INVENTOR(S) : Ernest R. Stettner et al

It is certified that error appears in the above—identified patent and that said Letters Patent is hereby corrected as shown below:

Column 7, lines 16-17, delete "latter at one end thereof being connected to an";

line 18, after "the" first occurrence insert -- latter at one end thereof being connected to an --;

line 21, "edge" should read -- edges --;

lines 63-64, delete "circumferentially spaced apart slot, 46a to provide for";

line 65, after "with" insert -- circumferentially spaced apart slots 46a to provide for --.

Column 8, lines 23-24, delete "electromagnetic fuel injector 10' shown, is also";

line 25, after "the" insert -- electromagnetic fuel injector 10' shown, is also --.

Signed and Sealed this

*Eighth* Day of *July 1986*

[SEAL]

*Attest:*

DONALD J. QUIGG

*Attesting Officer* *Commissioner of Patents and Trademarks*